United States Patent
Gray et al.

(10) Patent No.: US 7,066,197 B1
(45) Date of Patent: Jun. 27, 2006

(54) SUPPLYING WATER TO A RETICULATION SYSTEM FROM DIFFERENT SOURCES

(75) Inventors: Ian Gray, Brisbane (AU); Rodney Douglas Moore, Singleton (AU); Gregory Duncan Cameron, Goomalibee (AU)

(73) Assignee: Urban Rainwater Systems Pty Ltd, New South Wales (AU)

( * ) Notice: Subject to any disclaimer, the term of this patent is extended or adjusted under 35 U.S.C. 154(b) by 0 days.

(21) Appl. No.: 10/525,561

(22) PCT Filed: Sep. 1, 2003

(86) PCT No.: PCT/AU03/01120

§ 371 (c)(1),
(2), (4) Date: Apr. 4, 2005

(87) PCT Pub. No.: WO2004/020749

PCT Pub. Date: Mar. 11, 2004

(30) Foreign Application Priority Data

Aug. 30, 2002 (AU) .............................. 2002951098

(51) Int. Cl.
*E04D 13/00* (2006.01)
(52) U.S. Cl. ................. 137/357; 137/112; 137/395; 137/554; 137/565.16; 251/129.11; 251/248; 417/36
(58) Field of Classification Search ............... 137/357, 137/395, 554, 565.16, 112; 251/129.11, 251/248; 417/36
See application file for complete search history.

(56) References Cited

U.S. PATENT DOCUMENTS 4,161,186 A * 7/1979 Sitarz ........................ 137/357
4,934,404 A * 6/1990 DeStefano .................. 137/357
5,234,286 A * 8/1993 Wagner ....................... 405/53

FOREIGN PATENT DOCUMENTS

| DE | 3819330 | 12/1989 |
|----|---------|---------|
| DE | 4416038 | 11/1995 |
| EP | 1138836 | 10/2001 |
| GB | 2242926 | 10/1991 |

* cited by examiner

*Primary Examiner*—A. Michael Chambers
(74) *Attorney, Agent, or Firm*—Shoemaker and Mattare

(57) ABSTRACT

A water supply system for supplying water to a building including a water tank (13) for collecting water from the roof (10) and gutters (12) of the building (11); a water level sensor means (21) for sensing the level of water in the water tank; a tank water system (22) for supplying water from the water tank (13); a water pump (23) for pumping water from the water tank (13) along the tank water system (22); a non-return valve (25) downstream of the pump in the tank water system; a pressure sensor means (26) for sensing water pressure of water within the tank water system, said pressure sensor means (26) is located downstream of the non-return valve (25); a mains water system for supplying mains water; a three port valve (35) having a first port (34) connected to the tank water system downstream from the pressure sensor means (26), a second port (37) connected to the mains water system and a third port (41) connected to the building's water reticulation system; wherein when the first (34) and third port (41) are open the second port (37) is closed and when the second (37) and third port (41) are open the first port (34) is closed; and a control means (27) for operatively receiving inputs from the water level sensor means (21), pressure sensor means (26) and mains electricity supply (45) and controlling the water pump (23) and the three port valve (35).

16 Claims, 8 Drawing Sheets

SUPPLYING WATER TO A RETICULATION SYSTEM FROM DIFFERENT SOURCES

FIELD OF INVENTION

The present invention relates to a system for supplying water to a reticulation system from different sources. The present invention has particular but not exclusive application for a system using tank water and mains water supplies. Reference is made in the patent specification to tank water and mains water as water sources. This reference is by way of example only and other water sources or combinations of sources may be used.

PRIOR ART

Rainwater collected from the roofs of houses and buildings is commonly used in country areas. Rainwater is collected from the gutters and filtered through filtration systems before passing into a tank for storage. Water is drawn from the tank by the pump which supplies the water at pressure to the building's reticulation system.

In most urban areas, water is supplied through a mains water system which provides treated water to houses and buildings connected by a mains water supply network. Mains water is supplied under pressure so that when a valve is opened by the turning of a tap handle, water is passed out through the spout of the tap without interruption of supply.

The collection of rainwater in tanks in urban areas has previously been discouraged because of the availability of water supplied by the mains water system. Many local government authorities now allow the collection and use of rainwater stored in tanks in urban areas. However these authorities place strict requirements on tank water systems and do not allow water from tanks or any other source to enter the mains water system. With the prevention of tank water entering the mains water system, the possibility of contamination of mains water from tank water is avoided.

The change in attitude by local government authorities to the use of tank water in urban areas is due at least in part to the desire to minimize the run off passing into the stormwater drains which with heavy downfalls are prone to back up and cause localized flooding. Another incentive for local governments in allowing collection of water in tanks in urban areas is the overcoming of water storage limitations and supplying demand when there is a water shortage.

Where there is access to mains water, the water in the tank may be supplemented with mains water by the opening and closing of a valve operating automatically in response to a water level sensor within the tank. This type of system is commonly referred to as the trickle up system and maintains sufficient water in the tank to satisfy demand.

The problem with conventional tank water systems and trickle up systems is that water cannot be supplied to a building when there is a power failure or pump breakdown preventing water from being pumped through the water reticulation system of the building.

OBJECT OF THE INVENTION

It is an object of the present invention to provide an alternative water supply system which overcomes at least in part one or more of the abovementioned problems.

SUMMARY OF THE INVENTION

In one aspect the present invention broadly resides in a water supply system for supplying water to a building including a first water storage means;

a water level sensor means for sensing the level of water in the first water storage means;

a first water supply means for supplying water from the first storage means;

a water pump for pumping water from the first water storage means along the first water supply means;

a non-return valve downstream of the pump in the first water supply means;

a pressure sensor means for sensing water pressure of water within the first water supply means, said pressure sensor means is located downstream of the non-return valve, a second water supply means for supplying water from a second source;

a three port valve having a first port connected to the first water supply means downstream from the pressure sensor means, a second port connected to the second water supply means and a third port connected to the building's water reticulation system; wherein when the first and third ports are open the second port is closed and when the second and third ports are open the first port is closed; and a control means for operatively receiving inputs from the water level sensor means, pressure sensor means and mains electricity supply and controlling the water pump and three port valve.

The first water storage means preferably includes a water tank and the first water supply means includes a tank water system. The second water supply means preferably includes a mains water supply.

In another aspect the present invention broadly resides in a water supply system for supplying water to a building including a water tank for collecting water from the roofs and gutters of the building;

a water level sensor means for sensing the level of water in the water tank;

a tank water system for supplying water from the water tank;

a water pump for pumping water from the water tank along the tank water system;

a non-return valve downstream of the pump in the tank water system;

a pressure sensor means for sensing water pressure of water within the tank water system, said pressure sensor means is located downstream of the non-return valve, a mains water system for supplying mains water;

a three port valve having a first port connected to the tank water system downstream from the pressure sensor means, a second port connected to the mains water system and a third port connected to the building's water reticulation system; wherein when the first and third ports are open the second port is closed and when the second and third ports are open the first port is closed; and a control means for operatively receiving inputs from the water level sensor means, pressure sensor means and mains electricity supply and controlling the water pump and three port valve.

The water tank preferably includes one or more filters for filtering water from the roof and gutters prior to its entry into the water tank. Preferably the filters include a coarse debris screen located over the gutter or between the gutter outlet and the tank; an inlet filter located at the inlet to the tank and able to serve as an insect screen and or a fine filter located downstream of the pump but upstream of the pressure sensor means. Before water enters the water tank there is preferably a first flush water separation system which discharges the first portion of the water collected from the building's roof and gutter so that dirt, particulate debris and other residue is removed with the discharge of the first portion of the collected water.

The water level sensor means preferably includes a multi-level water sensor for detecting various levels of water in the tank so that different actions may be taken when different water levels are detected. Where there is a multi-level water sensor, water may be reserved for supplying to a special outlet pipe for drinking purposes when the sensor detects that the level is below a predetermined level.

The water level sensor means may be any one of a variety of suitable detectors which include float switches, ultra sonic methods, capacitance meters and other devices. A preferred device is one in which a magnet is placed in a float and is used to operate reed switches or provide a signal to a magnetic field sensor, preferably a Hall Effect device. In the latter, the output of the Hall Effect sensor is measured to provide multi-level detection.

The pressure sensor means preferably provides the control means with a signal indicating the pressure of water within the water lines from the water tank to the three port valve.

When the pressure is above a preset value, the control means switches off the pump either immediately or after a preset period of continued pumping. Pressure is maintained downstream of the non-return valve until water draw off causes it to be lowered, whereupon the pressure sensor will detect this state of lowered pressure and send a signal to the controller to cause the pump to be restarted. Preferably an accumulator is installed downstream of the non-return valve in the tank water system so as to reduce the frequency of the pump restarting. In the event that water is detected in the tank by the water level sensor and the operation of the pump does not cause the pressure detected by the pressure sensor to rise then the pump is turned off and the three port valve is switched to deliver mains supply water via the second port to the third outlet port. Thus water supply is maintained and pump damage is averted. A preferred form of the tank water system also includes a flow sensor downstream of the non-return valve which sends an electrical signal to the controller. In the event that a very low water flow occurs the output from this flow sensor can be used by the controller to delay repeated switching on of the pump as would otherwise be dictated by dropping pressure level.

The three port valve may be any suitable valve but is preferably a servo shuttle valve where the opening and closing of the ports is controlled by an electric motor actuated by signals from the control means to switch between mains water and tank water supply. The port positions are preferably sensed by a location sensing device such as micro switches, light based, or magnetic field based detectors. In a preferred form the servo shuttle valve has a shuttle that is moveable by lead screw connected to the output of the motor gearbox. The shuttle is moveable within the shuttle valve housing wherein the first and third ports are open when the second port is closed and the second and third ports are open when the first port is closed.

The servo shuttle valve in a preferred form breaks supply from one inlet port before opening the other inlet port thereby preventing upstream cross contamination of mains water with tank water. In an alternative form, the servo shuttle valve may open one inlet port before closing the other inlet port thereby relying on upstream non-return valves in both systems to prevent water contamination.

The control means preferably receives input signals from the water sensor in the tank, the pressure sensor detecting the pressure of water within water tank supply line and the availability of mains electricity. The control means preferably has a battery backup in the event of failure of mains electricity so that there is electrical power to switch the servo shuttle valve from one position to another. The control means controls the operation of the pump and preferably turns the pump off when the water sensor detects that the level of water within the tank is below a predetermined level. In this situation the control means actuates the servo shuttle valve to close the first port and open the second and third ports. Where there is an accumulator, the non-return valve prevents backflow from the accumulator through the pump and back into the tank. The accumulator provides pressurized water on demand when the first port is open.

The control means preferably has two modes of operation including an automatic mode where the controller automatically chooses the water source from the input signals from the water sensor and pressure sensor with a default setting for using tank water. The control means also has a manual mode of operation where either tank water or mains water may be chosen as the water source at the discretion of an operator. In the situation where there is a low water level detected in the water tank or there is detection of a pump or mains electricity supply failure, an alarm signal is sent to and displayed by the control means when tank water is chosen during manual mode of operation.

In the case that the pressure sensor is a switch it is preferable that it is of a kind that has some hysteresis in its switching behaviour, so that it switches on at a lower pressure when it switches off. This avoids unnecessary turning on and off of the pump.

In another aspect the present invention broadly resides in a water supply system for supplying water to a building including a water tank for collecting water from the roofs and gutters of the building;

a water level sensor means for sensing the level of water in the water tank;

a tank water system for supplying water from the water tank;

a water pump for pumping water from the water tank along the tank water system;

a non-return valve downstream of the pump in the tank water system;

a pressure sensor means for sensing water pressure of water within the tank water system, said pressure sensor means is located downstream of the non-return valve, a mains water system for supplying mains water;

a three port valve having a first port connected to the tank water system downstream from the pressure sensor means, a second port connected to the mains water system and a third port connected to the building's water reticulation system; wherein when the first and third ports are open the second port is closed and when the second and third ports are open the first port is closed; and a control means for operatively receiving inputs from the water level sensor means, pressure sensor means and mains electricity supply and controlling the water pump and three port valve; wherein there is an accumulator downstream of the pressure sensor means but upstream of the three port valve and there is a flow sensor downstream of the non-return valve but upstream of the three port valve.

Preferably there is a mains water system non-return valve upstream of the servo shuttle valve to open and close the mains water supply lines for providing mains water. The provision of a mains water system non-return valve acts as a further back flow prevention device to satisfy government requirements. There may also be a regulator upstream of the servo shuttle valve. There may preferably be a regulator downstream of the non-return valve but upstream of the servo shuttle valve. The regulator serves to prevent a change in flow rate between the switching from one water supply source to another.

In another aspect the present invention broadly resides in a water supply system for supplying water to a building including a water tank for collecting water from the roofs and gutters of the building;
- a water level sensor means for sensing the level of water in the water tank;
- a tank water system for supplying water from the water tank;
- a water pump for pumping water from the water tank along the tank water system;
- a non-return valve downstream of the pump in the tank water system;
- a pressure sensor means for sensing water pressure of water within the tank water system, said pressure sensor means is located downstream of the non-return valve,
- a mains water system for supplying mains water;
- a three port valve having a first port connected to the tank water system downstream from the pressure sensor means, a second port connected to the mains water system and a third port connected to the building's water reticulation system; wherein when the first and third ports are open the second port is closed and when the second and third ports are open the first port is closed; and
- a control means for operatively receiving inputs from the water level sensor means, pressure sensor means and mains electricity supply and controlling the water pump and three port valve; wherein there is a mains water system non-return valve upstream of the servo shuttle valve to open and close the mains water supply lines for providing mains water.

There may also be a regulator downstream of the non-return valve but upstream of the servo shuttle valve. There may preferably be a regulator downstream of the non-return valve but upstream of the servo shuttle valve.

In another aspect the present invention broadly resides in a water supply system for supplying water to a building including a water tank for collecting water from the roofs and gutters of the building;
- a water level sensor means for sensing the level of water in the water tank;
- a tank water system for supplying water from the water tank;
- a water pump for pumping water from the water tank along the tank water system;
- a non-return valve downstream of the pump in the tank water system;
- a pressure sensor means for sensing water pressure of water within the tank water system, said pressure sensor means is located downstream of the non-return valve,
- a mains water system for supplying mains water;
- a three port valve having a first port connected to the tank water system downstream from the pressure sensor means, a second port connected to the mains water system and a third port connected to the building's water reticulation system; wherein when the first and third ports are open the second port is closed and when the second and third ports are open the first port is closed; and
- a control means for operatively receiving inputs from the water level sensor means, pressure sensor means and mains electricity supply and controlling the water pump and three port valve; wherein there is an accumulator downstream of the pressure sensor means but upstream of the three port valve and there is a flow sensor downstream of the non-return valve but upstream of the three port valve; wherein there is a mains water system non-return valve upstream of the servo shuttle valve to open and close the mains water supply lines for providing mains water.

There may also be a regulator downstream of the non-return valve but upstream of the servo shuttle valve. There may preferably be a regulator downstream of the non-return valve but upstream of the servo shuttle valve.

Several forms of logic may be used by the controller in controlling the pump and three port valve of the water supply system. The logic systems are dependent on the sophistication of the water level sensing and whether a flow sensing device is included in the tank water system. Where a two or three level tank water level sensing device is used it is possible to reserve the lower section of the tank water for special purposes such as a drinking water outlet delivered from the tank via the pump while drawing general water supply from the mains water via the three port valve. Where a flow sensor and two or three level tank water level sensing device is used it is possible to permit the continued supply of water despite the drop of the water level in the tank below the upper level. This option saves the need for a brief interruption to water supply while the three port valve closes its tank port and opens its mains water port or vice versa.

In all cases in the event that there is no mains electricity supply the pump will not operate and the valve will be switched so that it delivers mains water to its outlet.

The logic of the system with a single water level sensor is that when the tank water level is above the sensed water level the pump is capable of operation and the valve is switched to tank water supply. When the tank water level falls below the sensed water level the pump ceases to operate and the valve switches to mains water. It is preferable for the water level sensor and controller to have some hysteresis in its behaviour so that minor water level fluctuation does not cause unnecessary pump and valve switching.

The logic of the system where a dual water level sensing is used and no flow measurement is incorporated is that when the water level is above the upper sensing level then the valve is switched to tank and the pump is capable of operation. When the water level in the tank falls below the upper sensing level the valve switches to mains water supply but the pump will be available for operation so as to supply water to the special outlet pipe normally reserved for drinking applications. When the water level falls below the lower sensing level then the pump will not operate. The lower sensing level may be set to correspond with a dry tank.

The logic of the system where a dual water level sensor and flow measurement is available is that when the water level is above the upper sensing level the valve is switched to pump supply and the pump is capable of operation. In the event that water is being drawn from the tank when the water level falls below the upper sensing level then the pump continues to operate and the three port valve remains switched to tank supply until the flow ceases whereupon the three port valve switches to mains supply. In the event that water is first drawn from the three port valve by the normal reticulation system while the water level is below the upper sensing level but above the lower sensing level then this water will be supplied by the mains water. Water may be drawn from the special water supply pipe via the pump whilst the water level is below the upper and lower sensing levels. When the water falls below the lower sensing level the pump will not operate. The lower sensing level may be set to a dry level in the tank.

The logic of the system where a three level water level sensor and flow measurement is used is that when the water level is above the upper sensing level the valve is switched to tank supply and the pump is capable of operation. In the event that water is being drawn from the tank when the water level falls below the upper sensing level then the pump continues to operate and the valve remains switched to tank supply until the flow ceases whereupon the valve switches to mains water supply. In the event that water is first drawn from the three port valve by the normal reticulation system while the tank water level is below the upper sensing level but above the middle sensing level then this water will be supplied by the mains water. Water may be drawn from the special water supply pipe via the pump whilst the water level is below the upper and above the lower sensing levels. In the event that the water level falls below the lower sensing level then the pump ceases to be able to operate. The lower sensing level may be set to a dry level in the tank.

BRIEF DESCRIPTION OF THE DRAWINGS

In order that the present invention be more readily understood and put into practical effect, reference will now be made to the accompanying drawings wherein.

DETAILED DESCRIPTION OF THE PREFERRED EMBODIMENTS

Figure 1:
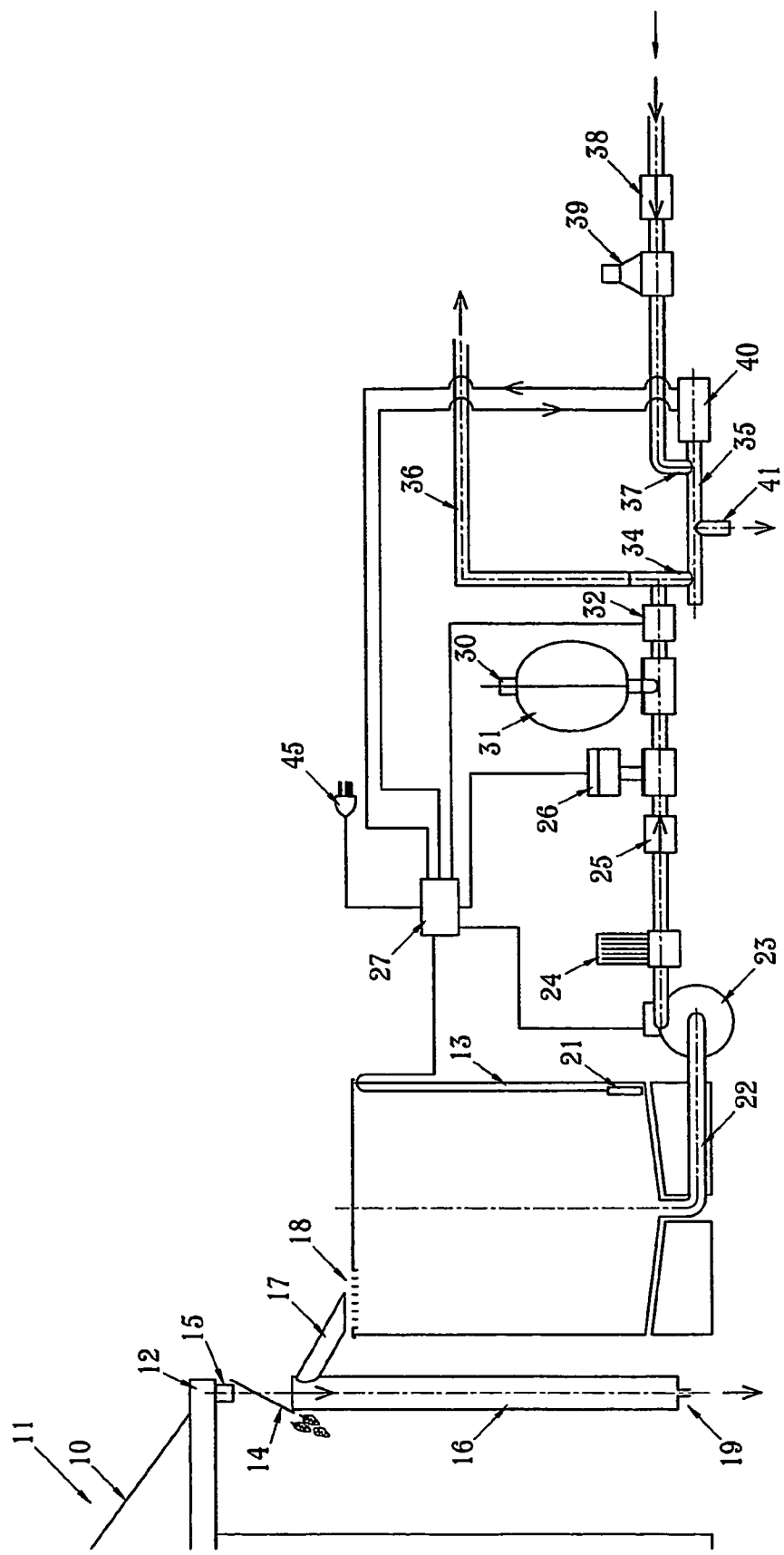
FIG. 1 is a diagrammatic view of the first preferred embodiment of the water supply system.

With reference to FIG. 1 there is shown a diagrammatic view of the first preferred embodiment. Rain water falls on the roof 10 of a building 11, flows into the gutter 12 and collects in the water tank 13. Coarse debris is prevented from entering the water tank 13 by an angled debris screen 14 which filters water flowing out of gutter spout 15. The water then enters a first flush system 16. The first flush system 16 takes the initial volume of water discharged from the roof 10 and incorporating particulate matter and any residue on the roof 10. In its simplest form the first flush system 16 includes a container that holds a volume of water and has a small discharge outlet 19. When the container has filled overflow passes through the spout 17 into the water tank 13 via the insect screen 18.

The water tank 13 has a water sensor 21 which has a single level device with hysteresis (or two or three level devices). Water is drawn from the water tank 13 via the outlet pipe 22 to the pump 23. The pump 23 pumps water through a fine particulate filter 24. From the filter 24, water flows through a non-return valve 25 and past a pressure switch 26 that provides water pressure information to the controller 27. Downstream of the pressure switch 26, there is an accumulator 30 which serves to provide pressurised water from the system without the pump 23 being turned on. The accumulator 30 is a gas charged device with a bladder 31. (The accumulator may alternatively be a spring operated piston accumulator.) Downstream of the accumulator 30 there is a flow sensor 32 which is electrically connected to the controller 27.

Pressurised tank water is delivered to one inlet port 34 of the servo shuttle valve 35. Alternately if the inlet port 34 is closed, water is discharged through outlet pipe 36.

Mains water supply is delivered to the other inlet port 37 of the servo shuttle valve 35 via a non-return valve 38 and pressure regulator 39. The servo shuttle valve 35 has a motor 40 which includes an electric motor, gearbox and position sensor. The motor 40 is operated by the controller 27. The motor 40 sends valve position location signals back to the controller 27. The servo shuttle valve 35 also has an outlet port 41 which is connected to the building's reticulation system.

The controller 27 is powered from mains electricity 45 and detects whether mains electricity is available. The controller 27 also receives input signals from the water tank water level sensor 21, pressure switch 26, and flow sensor 32. The controller 27 also has a battery backup which powers it when there is mains electricity failure. The battery backup is maintained in a charged state by electricity from the mains electricity system.

Figure 2:
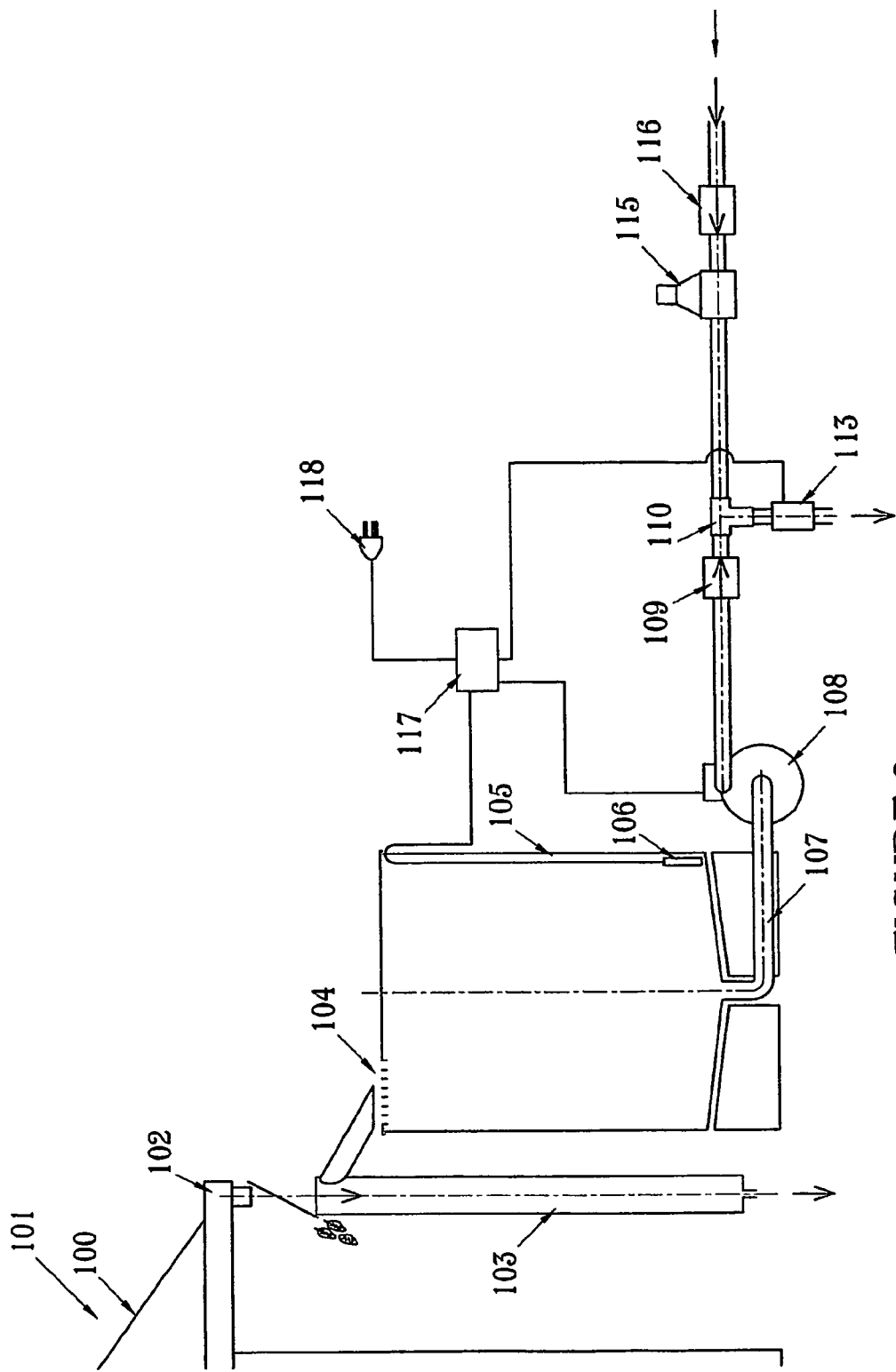
FIG. 2 is a diagrammatic view of the second preferred embodiment of the water supply system.

With reference to FIG. 2 there is shown an alternate water supply system. The alternate water supply system is similar in accumulating water from the roof 100 from building 101 through gutter 102, first flush system 103, and insect screen 104 into water tank 105. The water tank 105 has a water level sensor 106. Water is pumped through outlet pipe 107 by pump 108. The pump 108 provides pressurised water through non-return valve 109 to a tee connection 110. The tee connection 110 allows water to pass to the building's reticulation system via a flow sensor 113. The other side of the tee connection 110 is connected to the mains water supply via a pressure regulator 115 and non-return valve 116. The flow sensor 113 detects whether water is flowing to the building's reticulation system and sends a signal to the controller 117. The controller 117 receives signal inputs from the tank water sensor 106, flow sensor 113 and the availability of mains electricity 118. The controller 117 operatively controls pump 108 and as a consequence non-return valves 109 and 116.

If there is water in the water tank 105, the pump 108 is turned on and water is provided to the building's reticulation system. In this situation, non-return valve 116 closes and water from the mains water system does not flow into the building's reticulation system. In a preferred form, the water pumped from the pump 108 is at a higher pressure than the regulated mains pressure.

Figure 3:
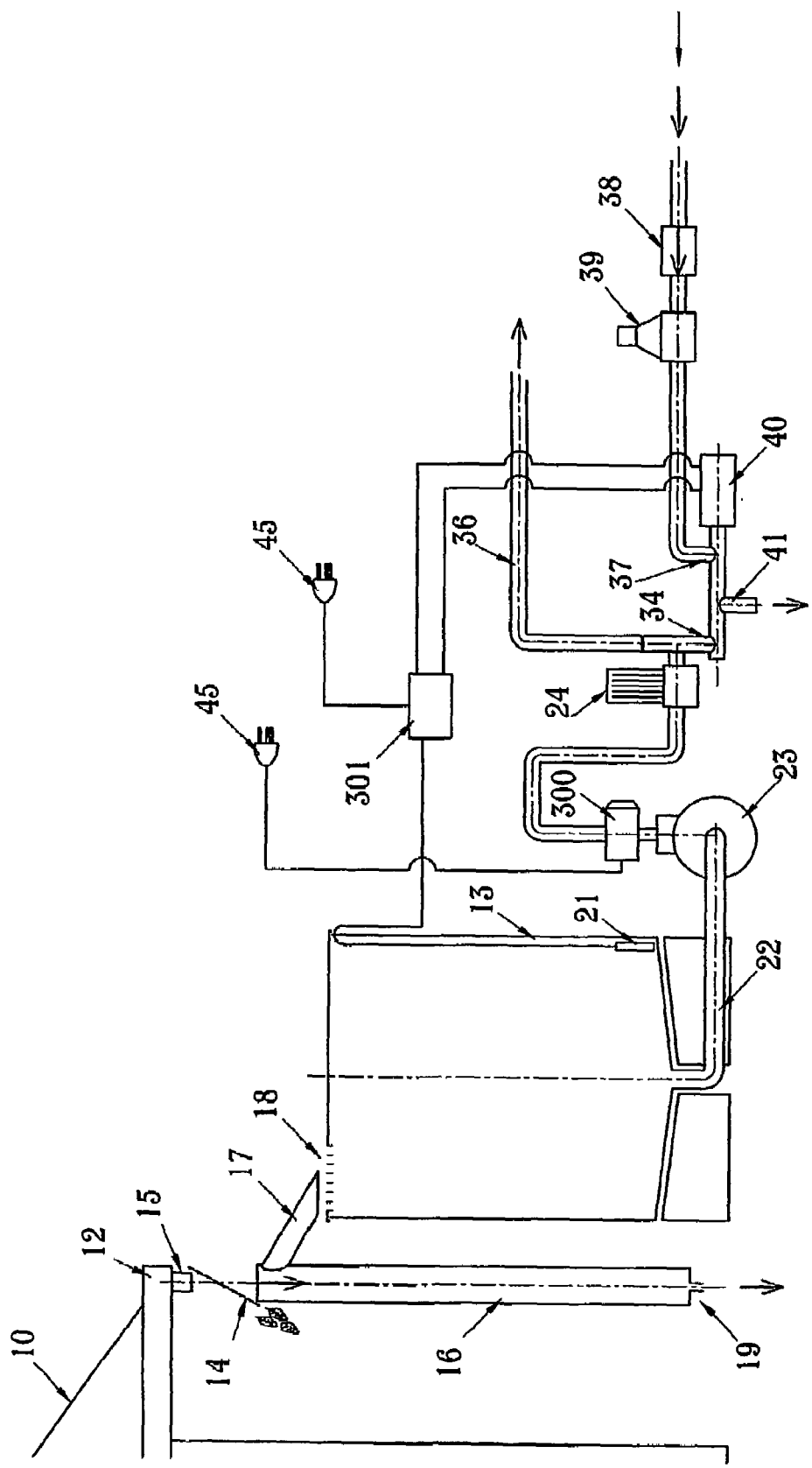
FIG. 3 is a diagrammatic view of the third preferred embodiment of the water supply system.

The alternate embodiment shown in FIG. 3 is similar to the preferred embodiment shown in FIG. 1. For convenience, the features have been numbered similarly except where there is a difference. The water supply system shown in FIG. 3 has a separate pump controller 300 which includes the functions of the accumulator, pressure switch and flow sensor. The pump controller 300 controls the pump which will not operate unless electricity is available to drive it. The system controller 301 serves only to receive signals from the tank water level sensor 21, mains electricity supply 45 and valve position sensors 40.

Figure 4:
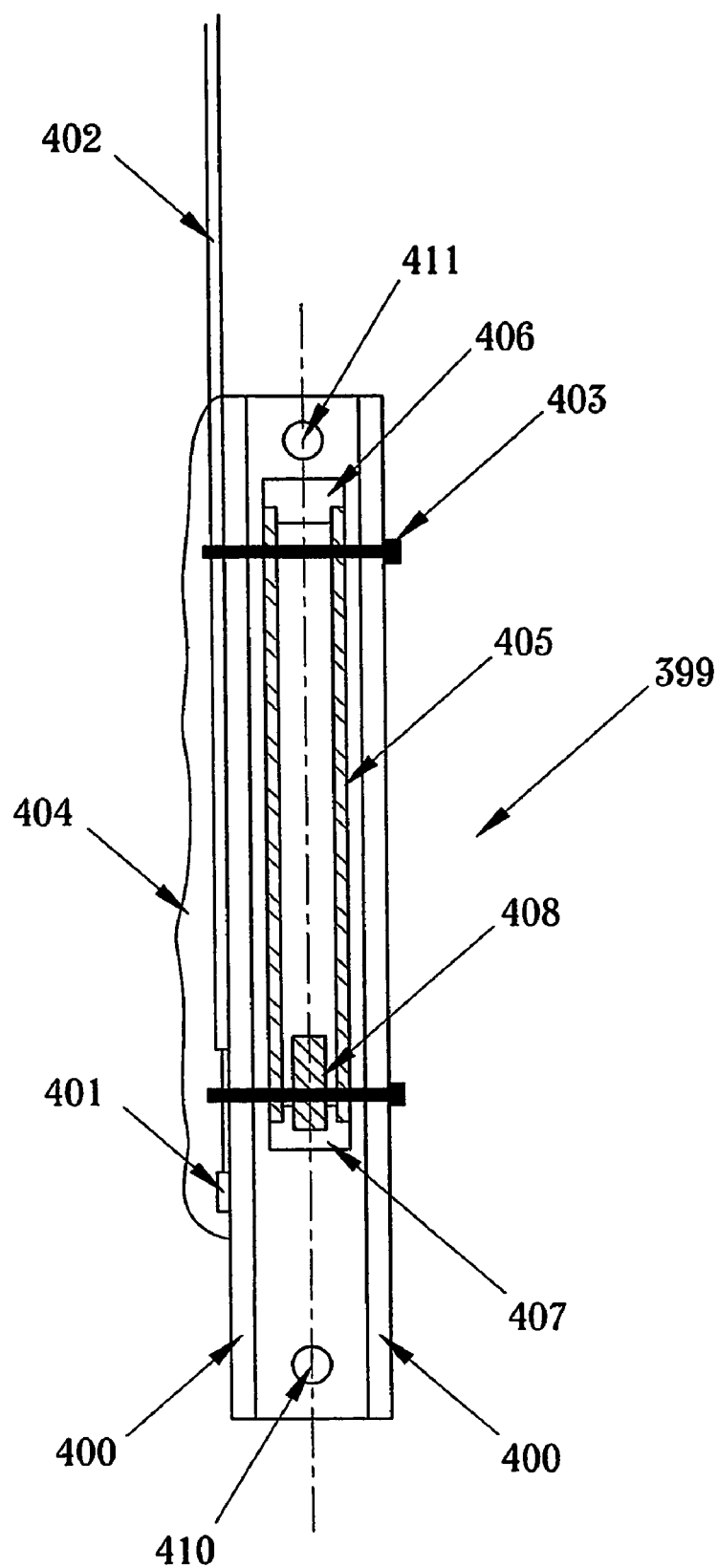
FIG. 4 is a diagrammatic view of the water level sensor of the preferred embodiments.

FIG. 4 shows the preferred form of the single or two level tank water level sensor 399. The only difference between the sensor types is the voltage level outputs chosen for control purposes. The sensor 399 has an outer tube 400 made of non magnetic material to which is attached a Hall Effect sensor 401. The Hall Effect sensor 401 is normally glued to the outer tube 400 and is attached to a cable 402. The cable 402 is held in position by cable ties 403 and the Hall Effect sensor 401 and cable 402 are waterproofed by use of a suitable sealant such as a silicone rubber 404. Within the outer tube 400 is a float tube 405 which is sealed at each end by an upper float end 406 and a lower float end 407. The lower float end 407 contains a magnet 408 which interacts with the Hall Effect sensor 401 to change its output. The float tube 405 is retained within the outer tube 400 by two retainers 410, 411 which may take the form of a pin or bolt. The float tube 405 may rise or fall between the limits of these retainers 410, 411.

Figure 5:
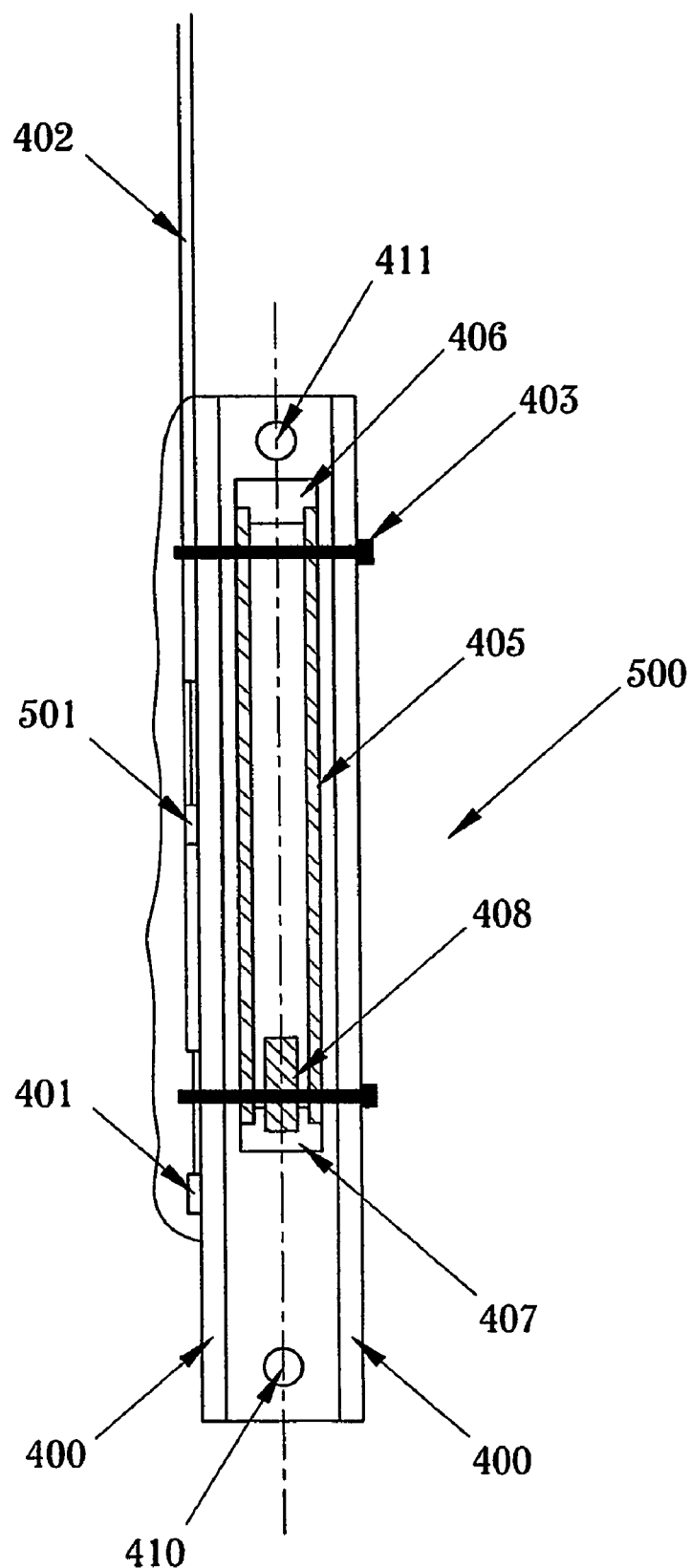
FIG. 5 is an alternate diagrammatic view of the water level sensor of the preferred embodiments.

In FIG. 5 a three level water level sensor 500 is shown. It is similar in features with the single or two level sensor 399 shown in FIG. 4 except that it includes a second Hall Effect sensor 501 on the outside of the outer tube 400. The similar features have been numbered the same as those shown in the sensor of FIG. 4.

Figure 6:
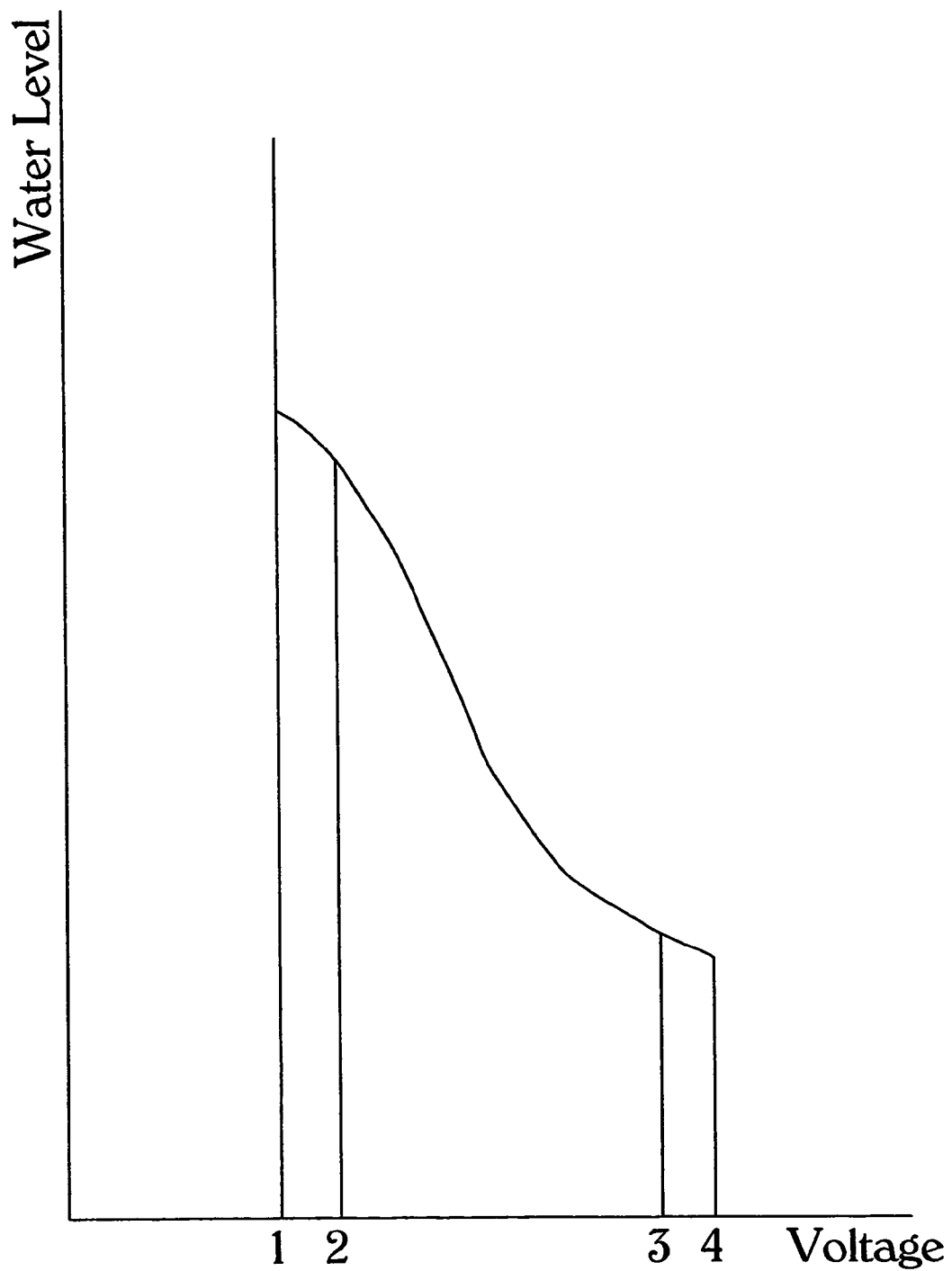
FIG. 6 is a graph showing the output from the Hall Effect sensor with respect to the water level in the water tank.

The graph shown in FIG. 6 shows the output of the Hall Effect sensor as used in the water level sensors. As the water level varies, the output voltage varies between the limits controlled by the retainers (levels 1 and 4). Two (or more) sensing levels (2 and 3) may be used by the controller. The voltage to water level relationship may be reversed by turning the magnet end to end (pole to pole).

Figure 7:
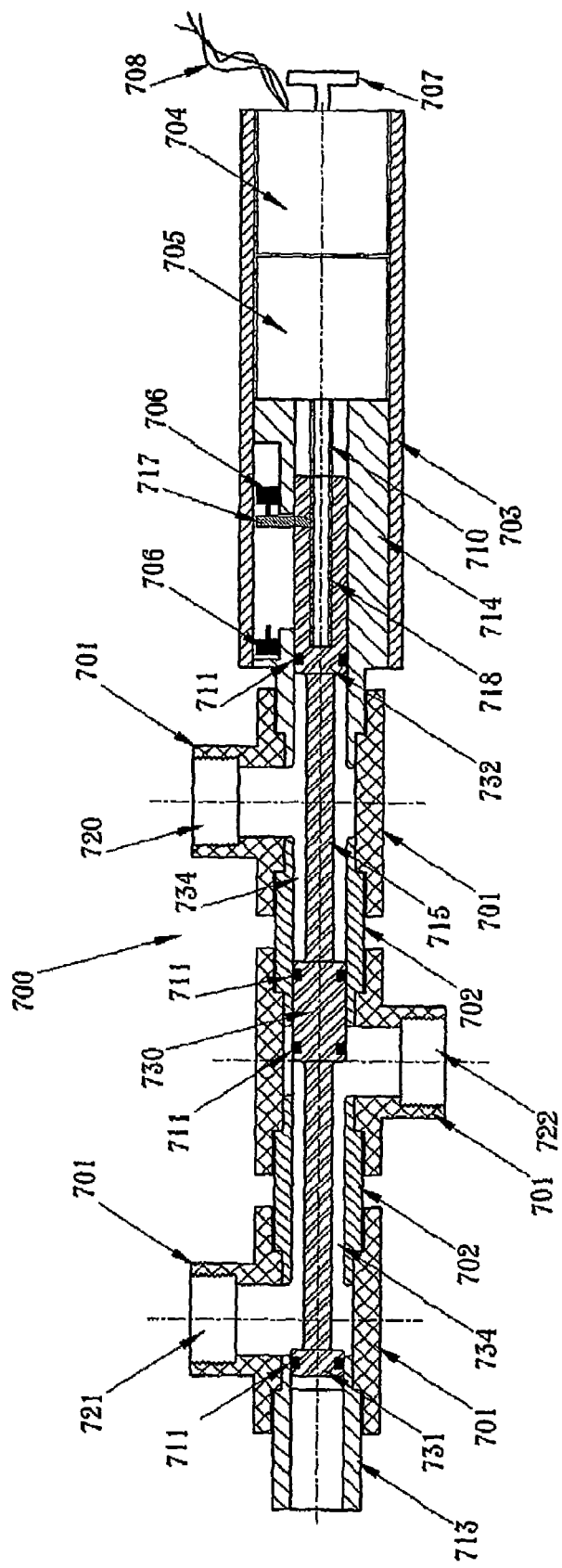
FIG. 7 is a diagrammatic view of the servo shuttle valve.
Figure 8:
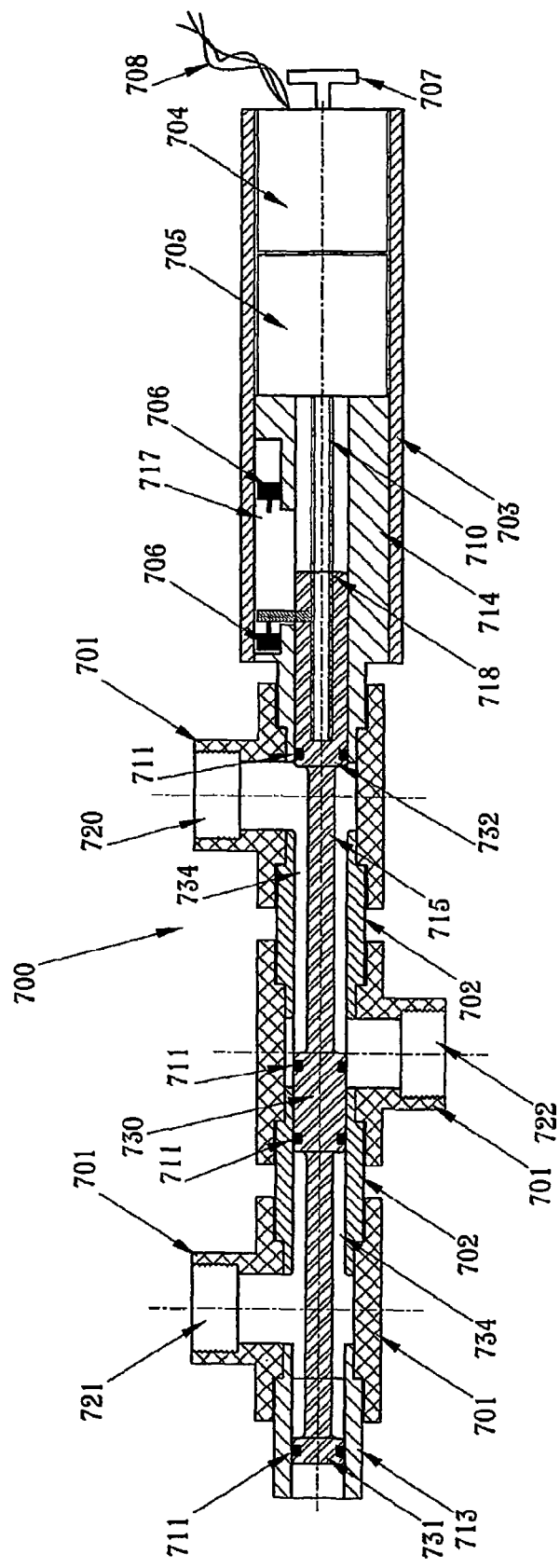
FIG. 8 is an alternate diagrammatic view of the servo shuttle valve.

With reference to FIGS. 7 and 8, there is shown the servo shuttle valve 700. In this form the servo shuttle valve 700 is made from three PVC plumbing Tee connections 701. The Tee connections 701 are joined by joiner members 702. A housing 703 for the electric motor 704, gearbox 705 and proximity switches 706 is connected to the motor end piece 714. A handle 707 protrudes from the end of the electric motor 704 for manually closing the valve 700. The rotation direction of the motor 704 is controlled by the polarity of the direct current that is supplied to it by cable 708. The motor 704 is connected to the gearbox 705 which is connected to the lead screw 710. The servo shuttle valve 700 has elastomeric seals 711 which seal the end pieces 713, joiners 702 and motor end piece 714. The shuttle member 715 is operatively connected to the lead screw 710 and has an internal thread 718 complementary to the thread of the lead screw 710. The shuttle member 715 has an indexing pin 717 set into it which prevents the shuttle member 715 from rotating caused by the turning of the lead screw 710. The indexing pin 717 also serves to activate the proximity switches 706 that determine the position of the shuttle member 715 and provide this information to the controller. These proximity switches 706 may be any suitable switch such as direct acting micro switches or light emitting diodes and sensors. The construction of the servo shuttle valve 700 does not require the shuttle member 715 to be withdrawn fully from the zone of the ports 720, 721, 722. This is an advantage conveyed by the use of a fabricated valve in that a chamber exists behind the port and this is of a larger size than that on which the shuttle member 715 seals. This feature permits less resistance to water flow through the device for a given shuttle movement than one in which the port directly intersects the shuttle valve body at the diameter of the shuttle.

The sealing members 730, 731, 732 move along the longitudinal internal bore 734 of servo shuttle valve under the influence of the lead screw 710 rotating within the internal complementary thread 718 of the shuttle member 715. The position of the sealing members 730, 731, 732 relative to each other is such that when inlet port 721 is open inlet port 720 is closed but outlet port 722 is open and when inlet port 720 is open inlet port 721 is closed and the outlet port 722 is open. The outlet port 722 preferably connects to the building's reticulation system while inlet ports 720 and 721 are connected to the mains water supply system and tank water supply system respectively.

FIG. 7 shows that the inlet port 721 connected to the tank water supply system is open and the outlet port 722 connected to the building's reticulation system is open, inlet port 720 connected to the mains water supply system is closed. FIG. 8 shows that the inlet port 720 connected to the mains water system and outlet port 722 connected to the building's reticulated system is open, the inlet port 721 connected to the tank water supply system is closed.

ADVANTAGES

The present invention provides the advantage of offering the choice of two water sources, namely tank water and mains water; and when there is a pump or electricity supply failure, mains water can still be provided to a building's reticulation system. A further advantage of the preferred embodiment is that there are two valve systems which prevent cross contamination of water from different sources. The design of a dual valve system provides a cautionary measure and satisfies government requirements.

VARIATIONS

It will of course be realized that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:
1. A water supply system for supplying water to a building including
   a water tank for collecting water from the roof and gutters of the building;
   a water level sensor means for sensing the level of water in the water tank;
   a tank water system for supplying water from the water tank;
   a water pump for pumping water from the water tank along the tank water system;
   a non-return valve downstream of the pump in the tank water system;
   a pressure sensor means for sensing water pressure of water within the tank water system, said pressure sensor means is located downstream of the non-return valve,
   a mains water system for supplying mains water;
   a three port valve having a first port connected to the tank water system downstream from the pressure sensor means, a second port connected to the mains water system and a third port connected to the building's water reticulation system;
   wherein when the first and third ports are open the second port is closed and when the second and third ports are open the first port is closed; and
   a control means for operatively receiving inputs from the water level sensor means, pressure sensor means and mains electricity supply and controlling the water pump and three port valve.

2. A water supply system as claimed in claim 1 wherein the three port valve is a servo shuttle valve where the opening and closing of the ports is controlled by an electric motor actuated by signals from the control means to switch between mains water and tank water supply.

3. A water supply system as claimed in claim 2 wherein the servo shuttle valve has a shuttle that is moveable by a lead screw connected to the output of the motor gearbox, said shuttle is moveable within the shuttle valve housing wherein the first and third ports are open when the second port is closed and the second and third ports are open when the first port is closed.

4. A water supply system as claimed in claim 1, further comprising an accumulator downstream of the non-return valve but upstream of the three port valve.

5. A water supply system as claimed in claim 2, further comprising a mains water system non-return valve upstream of the servo shuttle valve to open and close the mains water supply lines for providing mains water.

6. A water supply system as claimed in claim 5 further comprising a regulator valve upstream of the servo shuttle valve and the regulator serves to prevent a change in flow rate between the switching from one water supply source to another.

7. A water supply system as claimed in claim 1, wherein the control means has two modes of operation including an automatic mode where the controller automatically chooses the water source from the input signals from the water sensor and pressure sensor with a default setting for using tank water; and a manual mode of operation where either tank water or mains water may be chosen as the water source at the discretion of an operator.

8. A water supply system as claimed in claim 7 wherein when the control means is in manual mode and low water level is detected in the water tank or there is detection of a pump or mains electricity supply failure, an alarm signal is sent to and displayed by the control means when tank water supply is chosen.

9. A water supply system as claimed claim 1, wherein the water level sensor and controller are used to detect multiple water levels in the tank.

10. A water supply system as claimed in claim 1, wherein the water sensor means is a floating magnet and used to provide a signal to a magnetic field sensor being a Hall Effect device.

11. A water supply system as claimed in claim 10 wherein the output of the Hall Effect sensor is measured to provide multi-level detection.

12. A water supply system as claimed in claim 1 wherein the water level sensor means includes a multi-level water sensor and water may be reserved for supplying to a special outlet pipe for drinking purposes when the sensor detects that the level is below a predetermined level.

13. A water supply system as claimed in claim 1, wherein the pressure detected by the pressure sensor means is above a preset value, the control means switches off the pump either immediately or after a preset period of continued pumping, wherein pressure is maintained downstream of the non-return valve until water draw off causes it to be lowered, whereupon the pressure sensor will detect this state of lowered pressure and send a signal to the controller to cause the pump to be restarted.

14. A water supply system as claimed in claim 1, wherein when water is detected in the tank by the water level sensor and the operation of the pump does not cause the pressure detected by the pressure sensor to rise then the pump is turned off and the three port valve is switched to deliver mains supply water via the second port to the third outlet port.

15. A water supply system as claimed in claim 1, further comprising a flow sensor for measuring the rate of flow within the tank water system, said flow sensor is connected to the controller.

16. A water supply system as claimed in claim 1, wherein the controller enables water to be drawn from a tank below a preset threshold level to maintain continuity of supply without the interruption due to the transition of the 3 port valve from one supply source to another.

* * * * *